(12) United States Patent
Miesak

(10) Patent No.: US 7,453,552 B1
(45) Date of Patent: Nov. 18, 2008

(54) LASER AMPLIFICATION METHODS AND APPARATUSES

(75) Inventor: Edward J. Miesak, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

(21) Appl. No.: 11/184,505

(22) Filed: Jul. 18, 2005

Related U.S. Application Data

(60) Provisional application No. 60/588,504, filed on Jul. 16, 2004.

(51) Int. Cl.
 *G01C 3/08* (2006.01)
(52) U.S. Cl. ..................... 356/4.01; 356/5.01
(58) Field of Classification Search ............... 356/4.07
 See application file for complete search history.

(56) References Cited

U.S. PATENT DOCUMENTS

| | | | | |
|---|---|---|---|---|
| 3,846,588 | A * | 11/1974 | Holzwarth | 370/492 |
| 4,847,481 | A * | 7/1989 | Altmann | 250/206.1 |
| 5,751,830 | A * | 5/1998 | Hutchinson | 382/103 |
| 6,748,531 | B1 * | 6/2004 | Epstein | 713/158 |
| 2002/0171821 | A1 * | 11/2002 | Cloud et al. | 356/4.01 |
| 2003/0218795 | A1 * | 11/2003 | Barty | 359/333 |
| 2003/0218801 | A1 * | 11/2003 | Korniski et al. | 359/407 |
| 2004/0085526 | A1 * | 5/2004 | Gogoila et al. | 356/4.01 |
| 2004/0207847 | A1 * | 10/2004 | Hardy | 356/399 |

OTHER PUBLICATIONS

J. Kasparian, M. Rodriguez, G. Méjean, J. Yu, E. Salmon, H. Wille, R. Bourayou, S. Frey, Y. B. André, A. Mysyrowicz, R. Sauerbrey, J.P. Wolf, L. Wöste "White-Light Filaments for Atmospheric Analysis" Science Jul. 4, 2003: vol. 301. No. 5629, pp. 61-64.*

J. Kasparian, M. Rodriguez, G. Mejean, J. Yu, E. Salmon, H. Wille, R. Bourayou, S. Frey, Y. B. Andre, A. Mysyrowicz, R. Sauerbrey, J.P. Wolf, L W6ste "White-Light Filaments for Atmospheric Analysis" Science Jul. 4, 2003: vol. 301. No. 5629, pp. 61-64.*

(Continued)

*Primary Examiner*—Thomas H. Tarcza
*Assistant Examiner*—Timothy A Brainard
(74) *Attorney, Agent, or Firm*—Jeffrey D. Myers; Peacock Myers, P.C.; Timothy D. Stanley

(57) ABSTRACT

Laser amplification methods and apparatuses. With the invention, one can increase laser intensity on a target by computing a distance to the target, based upon the distance determining an ultra short laser pulse that will in traveling through a medium compress to approximately a minimum width, and emitting the pulse at the target, whereby an intensity of the pulse is approximately maximized upon contact with the target. One can also amplify and detect a laser return signal by receiving the laser return signal, amplifying the received return signal by optical parametric amplification and detecting the amplified signal. One can further perform spectroscopy by determining an ultra short laser pulse such that the pulse compresses and then expands in traveling through a medium, emitting the pulse at a target, and performing spectroscopic analysis of the pulse after propagation.

4 Claims, 4 Drawing Sheets

OTHER PUBLICATIONS

"Laser Technique Allows Noiseless Image Amplification", *Photonics Technology World*, (Nov. 1999), pp. 1-2.

"Near-noiseless amplification of light by a phase-sensitive fibre amplifier", *Pramana Journal of Physics—Indian Academy of Sciences*, http:/www/iisc.ernet.in/pramana/fm2001/QT14.pdf,(Feb. & Mar. 2001),pp. 281-285.

"Publications of the Teramobile Project", http://pclasim47.univ-lyon1.fr/publis.html, (May 23, 2003).

"The phase-mismatch vector and resolution in image parametric amplification", *Journal of Optics A: Pure and Applied Optics*, (Dec. 1999), p. 1-2.

Dimitriev, V. G., et al., *Handbook of Nonlinear Optical Crystals*, Springer-Verlag, 2nd Ed.,p. 162.

* cited by examiner

LASER AMPLIFICATION METHODS AND APPARATUSES

CROSS-REFERENCE TO RELATED APPLICATIONS

This application claims priority to and the benefit of the filing of U.S. Provisional Patent Application Ser. No. 60/588,504, filed on Jul. 16, 2004, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to laser amplification methods and apparatuses to enhance optical measurements.

2. Description of Related Art

Lasers are often used in applications, such as environmental monitoring, that require their beams to be sent over long distances through the atmosphere. Strong laser light on target is often a critical factor in determining the success of the application. Strong laser light on areas other than the target of interest can cause noise and/or spurious signals. The present invention provides novel methods and apparatuses permitting one to have high intensity on target and low intensity everywhere else and to amplify backscattered laser light.

BRIEF SUMMARY OF THE INVENTION

The present invention is of a method of (and corresponding apparatuses for) increasing laser intensity on a target, comprising: computing a distance to the target; based upon the distance, determining an ultra short laser pulse that will in traveling through a medium compress to approximately a minimum width; and emitting the pulse at the target; whereby an intensity of the pulse is approximately maximized upon contact with the target. In the preferred embodiment, a return pulse is received, preferably in a laser radar or light detection and ranging system. The computing step can employ a receiving optical parametric amplifier. The laser pulse has fastest propagating wavelengths at the front of the pulse and slowest propagating wavelengths at the rear of the pulse, preferably one that compresses its width on its way to the target and increases its width on its way back from the target.

The invention is also of a method of (and corresponding apparatuses for) detecting a laser return signal, comprising: receiving the laser return signal; amplifying the received return signal by optical parametric amplification; and detecting the amplified signal. In the preferred embodiment, a time-sliced optical parametric amplification is employed. The amplifying step provides an added gain of greater than $10^4$. One can additionally perform heterodyne detection for further improvement. The laser return signal is preferably a return signal from an ultra short laser pulse. A periodically poled material is preferred for the amplification. The amplifying step can also provide optical power limitation to protect a detector of the amplified signal. A pump beam substantially smaller than that of a return signal beam can be employed to generate a higher intensity signal where the beams overlap. The analysis is preferably part of a laser radar or light detection and ranging system. The amplifying step can simultaneously perform band-pass filtering of the amplified signal.

The invention is additionally of a method of (and corresponding apparatuses for) performing spectroscopy, comprising: determining an ultra short laser pulse such that the pulse compresses and then expands in traveling through a medium; emitting the pulse at a target; and performing spectroscopic analysis of the pulse after propagation. In the preferred embodiment, the performing step comprises employing a time sliced optical parametric amplifier. The laser pulse comprises fastest propagating wavelengths at the front of the pulse and slowest propagating wavelengths at the rear of the pulse, preferably creating a pulse that compresses its width on its way to the target and increases its width on its way back from the target. One can additionally perform either or both of deconvolution and scanning of the return signal. One can encrypt information in the pulse and decrypt at the target; the emitting step can then be done at long infrared wavelengths and the performing step can then be done at near infrared wavelengths.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
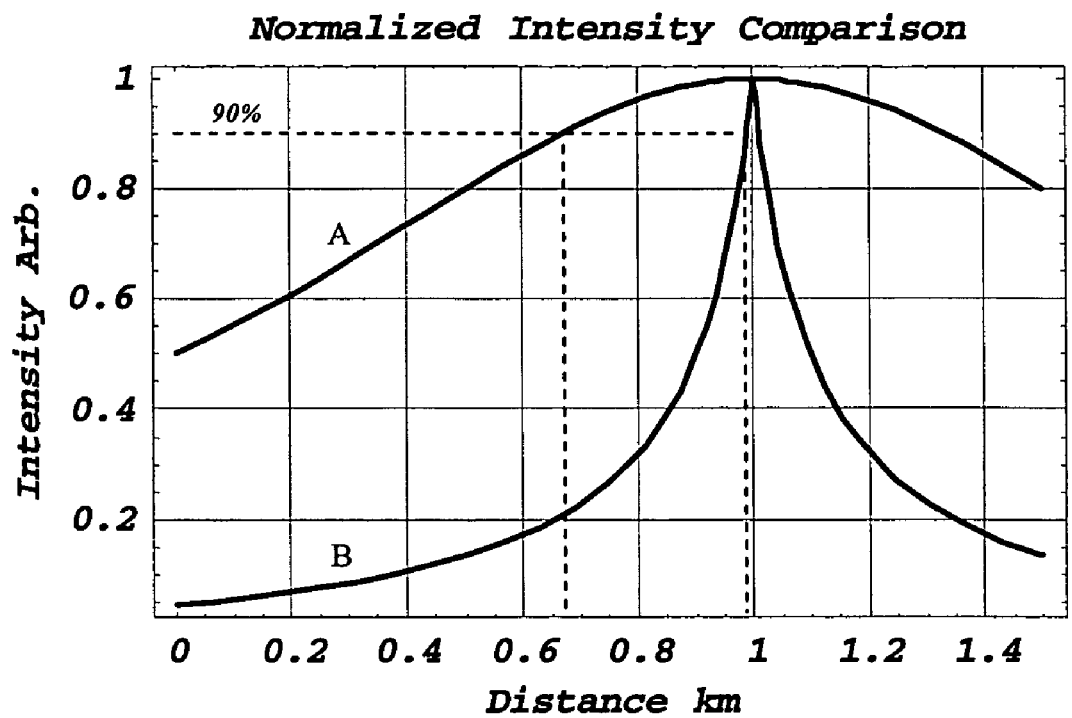
FIG. 1 is a graph of intensity vs. propagation distance of a nsec (A) and fsec (B) laser.

Ultra Short Pulse (USP) lasers are used for intensity modulation according to the present invention by virtue of the dispersion of the medium that the pulse travels through (e.g., air). The various wavelengths making up a laser pulse will travel at different speeds through the medium if the index of refraction of the medium is not constant across the spectrum of the pulse. This is the case for air. A 100 fsec FWHM pulse centered at 800 nm will stretch about 1 fsec per meter of propagation. An fsec laser pulse can be "reverse-stretched" so that the slowest moving wavelengths are at the front of the pulse and the fastest moving wavelengths are at the back of the pulse. As this pulse propagates it will get shorter in time (i.e., compress). The amount of reverse-stretch applied to the pulse depends on how far away the target is and if the operator wants to put maximum intensity (minimum pulse width) on the target or on the receiver.

Reverse-stretching a femtosecond scale pulse has been employed in the prior art to create high intensity in the atmosphere for the purpose of making plasma filaments. These filaments are "stitched" together into a continuous filament for various purposes. Atmospheric pulse compression is used to cause the laser pulse to reach minimum length at some distance corresponding to the end of a previously created plasma filament. A new one can then begin there and continue on for another 100 meters or so.

Reverse stretching is employed by the present invention to benefit LADAR (Laser Radar) and LIDAR (Light Detection and Ranging) systems (LI/ADAR) by keeping the intensity of the laser pulse low until it is needed to go high. It provides a very good spatial resolution, plus or minus 11 meters in the case of a 100 fsec pulse. The resolution increases as the pulse gets shorter. The invention reduces background noise and maximizes the return signal in a LI/ADAR system. The invention increases the resolution of both direct and coherent detection systems.

Heterodyne detection enhances the received optical signal of a LADAR/LIDAR system by a maximum factor of about 1000 ($10^3$). This comes from the dynamic range of a photodetector being about 1000. By using the phenomenon of optical parametric amplification (OPA) the enhancement gain can be as much as $10^{12}$. This extra gain can be used to extend the useful range of the system and/or reduce the size of the collection optics. The area of the receiver optic can be reduced by the amount of added gain. Therefore, an added gain of $10^6$ would reduce the diameter of the receiver optic by 1000.

Typical heterodyne detection mixes a reference laser with the received signal on the surface of a photodetector. This process produces an enhancement (gain) of the received signal. The enhanced gain receiver preferred in the present invention uses an optical crystal and a high intensity laser beam to amplify the received optical signal. This optical amplification increases the level of the received signal and then preferably goes through the standard heterodyne detection process. One can also do the amplification and heterodyning simultaneously.

The fundamental amplification process (OPA) is sometimes applied in the transmitter portion of LADAR/LIDAR systems (OPO transmitters). However, this process is not known to have been applied to the receiver end of an optical radar system.

OPAs are based on powerful non-linear optical (NLO) effects. These bring unique solutions to bear upon difficult problems. For instance, the parametric gain process is phase sensitive. A coherent return signal has phase information whereas noise does not. The OPA will amplify the in-phase signal components but not any others. So, this amplifier is also a noise discriminator. A properly designed OPA is naturally optically hardened. It can be made into a very effective optical power limiter. An OPA is very wide band, in that an ordinary NLO crystal has a transmission window from 0.3 to 4.5 microns. More exotic crystals have transmission windows of 0.6 to 13 microns. The optical response of an OPA is limited only by the transmission band of the NLO crystal and the wavelength of the pump laser.

The techniques of the present invention are next presented in detail.

Performance Enhancement by Intensity Modulation

Lasers are often used in applications that require their beams to be sent over long distances through the atmosphere, i.e., LI/ADAR, communications, sensing, guide star, etc. Strong laser light on target is often a critical factor in determining the success of the application. Strong laser light on areas other than the target of interest can cause noise and/or spurious signals. The best situation is to have high intensity on target and low intensity everywhere else.

The method of the present invention enables laser beam intensity to be concentrated on a target at long distances (>km) with high resolution (a few meters or better) and localized effect.

One way to quantify the strength of a laser beam is intensity as shown in Equation [1] below.

$$\text{Intensity} = \frac{\text{Power}}{\text{Area}} = \frac{\text{Energy}}{\pi \times Rad^2 \times \text{Time}} \qquad [1.]$$

There are three ways to increase laser intensity:

a. Increase the pulse energy.→Atmospheric absorption decreases energy.

b. Decrease the spot size.→Atmospheric scattering increases spot size.

c. Decrease the pulse length.→Atmospheric dispersion changes pulse length.

Changing the intensity of a laser beam as it propagates is referred to here as Intensity Modulation. The intensity modulation index (IMI) is an indicator of how much the laser intensity changes during propagation. Equation [2] shows how IMI is calculated.

$$IMI = \frac{\text{High} - \text{Low}}{\text{High} + \text{Low}} \times 100 \qquad [2.]$$

IMI is basically a percent difference between the highest and lowest laser intensity achieved during propagation. The larger the number the greater the effect. Two practical methods exist to change the intensity of a laser beam during propagation, change the beam's radius or pulse length.

Ultra-short pulse (USP) lasers (<psec) act on the time argument in Equation [1] when propagating through a dispersive medium such as air. Long pulse lasers ($\geq$nsec) do not do this because of their limited optical bandwidth.

The index of refraction of air is not constant across the optical spectrum. This causes different wavelengths to travel at different speeds in air. If a pulse of laser light is made up of many different wavelengths then some will travel faster than others during propagation through air. The number of wavelengths making up a pulse of light is inversely proportional to its length in time. Femtosecond pulses have many more wavelengths than nanosecond (or longer) pulses. So, femtosecond pulses will change their length during propagation through air while nanosecond (or longer) pulses will not.

EXAMPLE

Two lasers are being used to put maximum intensity on a target 1 km down range. They are identical except for their pulse lengths, 1 nsec vs. 100 fsec FWHM. Their wavelengths are both $\lambda=1.5$ µm. Equation [3] below gives a general expression for the optimum starting radius for a laser beam to achieve the minimum spot size at a given distance z. This equation assumes that the laser beam has a very low $M^2$.

$$\omega_o(optimum) = \left(\frac{\lambda z}{\pi}\right)^{\frac{1}{2}} \quad [3.]$$

Equation [4] below models the laser beams radius versus distance.

$$\omega(z) = \omega_o\left[1 + \left(\frac{\lambda z}{\pi \omega_o^2}\right)^2\right]^{\frac{1}{2}} \quad [4]$$

Equation [4] can be used with a fixed laser power to calculate how the intensity changes with distance assuming no atmospheric losses to absorption or scattering and no Kerr lens effect. This equation applies to both the nanosecond and femtosecond lasers.

Equations [5a, b] model the pulse length in time during propagation. These equations apply only to the femtosecond laser. The variable $t_o$ represents the original pulse width, 100 fsec for this example. $\Phi$ represents a negative "pre-stretch" applied to the pulse, and $\delta(z)$ (group delay) is the amount of time per distance that the pulse width increases during propagation ($\approx 1$ fsec/m of pulse width increase for a 100 fsec FWHM pulse at $\lambda=800$ nm).

$$t_p(z)=t_o+\Phi-\delta(z) \quad [5a.]$$

$$t_p(z)=t_o-\Phi+\delta(z) \quad [5b.]$$

The negative pre-stretch is equal to the total group delay at the target distance but opposite in sign, i.e., $\Phi=-\delta(z)=1$ psec at 1 km for this example. Equation [5a] is used for z=0 to 1 km while Equation [5b] is used for z≧1 km. The negative pre-stretch $\Phi$ is imparted onto the pulse in real time by the laser system. It arranges the wavelengths making up the laser pulse so that the fastest propagating ones are at the back of the pulse while the slowest ones are at the front of the pulse. The distance between the fastest and slowest traveling wavelengths is set so that they will overlap at the target distance. As the pulse propagates to the target its width is decreasing (pulse compression) and once it passes the target its width begins increasing.

A plot is given in FIG. 1 of the beam intensity during propagation of both lasers normalized to one. Because the target is far away (1 km) both laser beams are almost collimated. The intensity increase due to a reduction in cross-sectional area (A) is 2 in this case (IMI=33.3%.) This could be increased some amount with a larger beam at the origin of propagation. The intensity increase due to a reduction of beam cross-section and also pulse compression (B) is 22 (IMI=91.3%.)

The localization of peak intensity is sometimes an important feature. For instance, a LI/ADAR beam can be concentrated on a target of interest submersed in a noisy environment to enhance the signal and reduce the background noise (probing a forest floor through the tree leaves). The 90% peak intensity points for the nanosecond IMI is ±667 m and ±11 m for the femtosecond IMI.

USP intensity modulation can be a very effective long range focusing device with very good z axis resolution. The IMI is more pronounced as the pulse width gets shorter and as the target gets farther away. The z axis resolution gets better as the pulse width gets shorter.

This phenomenon is not unknown. Researchers have exploited USP compression by atmospheric propagation in laboratory environments to generate plasma filaments at distance, particularly by the Teramobile Project of the University of Lyon. However, the phenomenon is used in the present invention as a general intensity modulation device effective over long distances. It is not used for filament generation, only for intensity enhancement.

Spectrally Resolved LI/ADAR

USP lasers can be used as a LI/ADAR transmitter and also as the pump laser in the OPA receiver. The transmitted pulse can exploit IMI to put maximum intensity on the target or on the receiver. This corresponds to placing the minimum pulse width on the target or the receiver in the Intensity Modulation embodiment of the present invention. A USP laser pulse has enough bandwidth to be useful as a spectroscopic sensor medium. When the pulse is at minimum width all the wavelengths making it up are overlapping in time. When the pulse is stretched the wavelengths are each separated by some time interval. Knowing the extent of the stretch tells the operator the time separation of each of the wavelengths.

Figure 2:
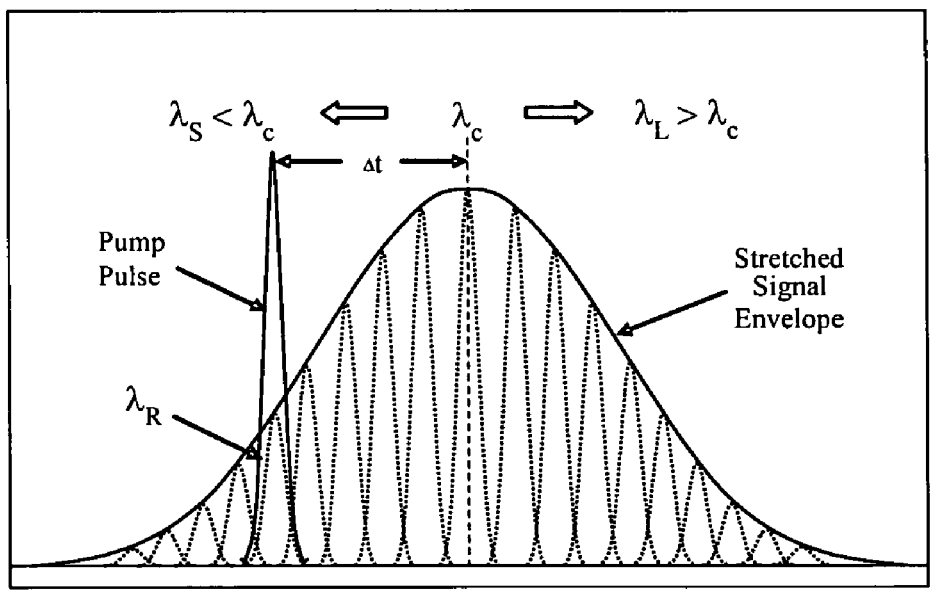
FIG. 2 is a graph showing spectrally resolving a return signal using time delay according to the invention.

Time slicing in the OPA can be used to amplify only certain portions of a stretched pulse. (If the pulse is not stretched then the OPA will amplify all the spectroscopic components of it.) FIG. 2 shows a stretched pulse overlapping with a pump pulse in time according to the present invention.

In FIG. 2 the LI/ADAR transmitter pulse is in the fsec domain when it goes out. By the time it is collected it is stretched as shown. For this example the longer wavelengths are at the front of the pulse and the sorter wavelengths are at the back.

$\Delta t$ is positive in relation to the center of the received pulse causing the pump pulse to fall behind some amount of time. If $\Delta t$ was zero then both pulses would be centered on each other. $\lambda_R$ is the wavelength region of the received pulse that gets parametrically amplified. By shifting $\Delta t$ from positive to negative values the entire received pulse will be amplified wavelength by wavelength. Spectral resolution is accomplished using time delay.

The same method can also be used to spectrally resolve single shot LADAR images.

Spectral Resolution

The resolution of the method and system according to the invention is determined by the original pulse width, the center wavelength of the laser, the stretched pulse width, and the pulse width of the pump laser. For the calculations here the pump and un-stretched transmitter pulse width will be equal. The concept of an unresolvable band of wavelengths is used here. From FIG. 2 it is seen that the pump pulse overlaps a portion of the stretched return pulse, $\lambda_R$. This portion is the band of unresolvable wavelengths referred to here as a "slice." The width of a slice in the spectral domain is determined by the time width of the pump pulse. If deconvolution and/or scanning techniques are not used it defines the resolution limit of the system. An example resolution calculation is given below.

RESOLUTION EXAMPLE

| | |
|---|---|
| τ = 100 fsec | original pulse width of pump, transmitter pulse. |
| T = 2 psec | stretched pulse width (in the OPA.) |
| BW | bandwidth of a 100 fsec FWHM pulse. |
| λc = 800 nm | center wavelength of the transmitter pulse. |

Assume the laser is operating at the Fourier transform limit (0.44 for Gauss.)

$$0.44 = \tau v = \tau \frac{\Delta \lambda c}{\lambda_c^2} \qquad [6.]$$

BW(Δλ)=9.39 nm.

$$\tau N = T \qquad [7.]$$

N=20 (slices in one stretched pulse.)

$$\text{Spectral resolution per slice} = \frac{BW}{N} = \frac{9.39 \times 10^{-9}}{20} = 0.469 \text{ nm}.$$

The spectral resolution will be limited by the timing stability of the pump laser and the return pulse. Deconvolution and/or scanning techniques can be used to increase the resolution of the system to sub-Angstrom.

Optical System Enhancement Through OPA

An Optical Parametric Amplifier (OPA) can also be used to significantly enhance the performance of a variety of coherent optical systems. As well known in the art, an OPA is a wideband, tunable, sensitive, optically hardened, accurately time sliced optical amplifier.

One example of a practical USP laser is the FHOENICS™. This is a compact high power diode based laser that is an ideal component for use in systems based on non-linear optics (NLO) phenomena. Specifications of this laser are:

a. 50 MHz repetition rate (burst mode.)
   b. 1.5 μm, 0.98 μm wavelengths.
   c. 250 fsec pulse width FWHM.
   d. 1 μJ per pulse.
   e. 4 MW unfocused peak power, 56.6 GW/cm² in a 150 μm radius spot.
   f. >50% efficiency possible, less than shoebox size, tolerant to physical abuse.

The phase noise of a FHOENICS laser can be as low as −140 dBc/Hz at 1 KHz offset from the carrier (≈1 GHz.) Typical integrated timing jitter is ≈−$10^{-4}$ of the pulse repetition frequency. Initial start-up of the laser from noise is slightly longer than 1 μsec. During mode-locked operation the electrical driver can be "jumped" 180° in phase and the output pulses will reach equilibrium in about 45 nsec (22 MHz).

OPA is a phenomenon that can amplify one wavelength of light (Signal) by transferring energy to it from another (Pump.) In the process a third wavelength, longer than the Signal and referred to as the Idler, is generated. The energy transfer is defined by the Manley-Rowe relations.

$$\omega_{Pump} = \omega_{Signal} + \omega_{Idler}. \qquad [8.]$$

The FHOENICS laser can be used as the pump, i.e., an energy source for the amplification process. The goal is maximum energy transfer from the pump to the signal, the optical wavelength being amplified. Therefore $\omega_{Pump} \approx 2\omega_{Signal} \approx 2\omega_{Idler}$. The wavelengths chosen for an embodiment of the present invention are $\lambda_{Pump}$=0.98 μm and $\lambda_{Signal}$=1.5 μm making $\lambda_{Idler}$=2.8 μm. Therefore every 0.98 μm photon splits giving 67% of its energy to the signal and 33% to the idler.

A simulation of a relevant OPA was written using and the finalized simulation was then used to predict the OPA gain using the FHOENICS laser as a pump. The first three equations below are well known and relate optical wavelength to frequency.

$$\lambda = \frac{1}{\omega} \qquad [9.]$$

$$v = \frac{c}{\lambda} \qquad [10.]$$

$$\omega = 2\pi v \qquad [11.]$$

The next equation models gain in a traveling wave optical amplifier. g is the gain coefficient, α is the loss coefficient, and l is the gain path length.

$$\text{gain} = \text{Exp}[(g-\alpha) \times l] \qquad [12.]$$

The next equation is used to calculate the electric field of a laser beam.

$$\frac{P_3}{A} = \frac{1}{2} \sqrt{\frac{\varepsilon_o}{\mu_o}} n_3 |E_3|^2. \qquad [13.]$$

The next equation calculates the non-depleted optical parametric gain coefficient.

$$g = 2 \sqrt{\frac{\mu_o}{\varepsilon_o} \frac{\omega_1 \omega_2}{n_1 n_2}} d_{eff} E_3(0). \qquad [14.]$$

Equations [13, 14] show that the parametric gain coefficient is proportional to the intensity of the pump ($\omega_3$) and can reach high levels with the proper pump laser. Lithium Niobate (LiNbO$_3$) is used as the mixing crystal in the following simulation. Additional parameters are:
LiNbO$_3$ d$_{31}$=5×10$^{-23}$
NCPM, zero walk-off angle.
n$_1$=2.2, n$_2$=2.0
Transparency range=0.4 to 5.5 μm.
Absorption=0.002 cm$^{-1}$.
Damage threshold>1 GW/cm² at 1 μm for a 6 psec pulse. The threshold increases as the pulse width decreases so there is a safety factor for 0.25 psec pulses.
$\lambda_1$=1.5 μm, $\lambda_2$=2.8 μm, $\lambda_3$=0.98 μm
$\omega_1$=signal, $\omega_2$=idler, $\omega_3$=pump ($\omega_2 = \omega_3 - \omega_1$)
$v_1$=2×10$^{14}$ Hz., $v_2$=1.06×10$^{14}$ Hz., $v_3$=3.06×10$^{14}$ Hz.
Pump pulse energy=283 nJ.
Pump width=250 fsec FWHM.
Pump beam radius=150 μm.

Pump confocal parameter=144 mm.
$P_3$=1.6 GW/cm$^2$
Non-depleted pumping condition, perfect phase matching ($\Delta k$=0.)

Figure 3:
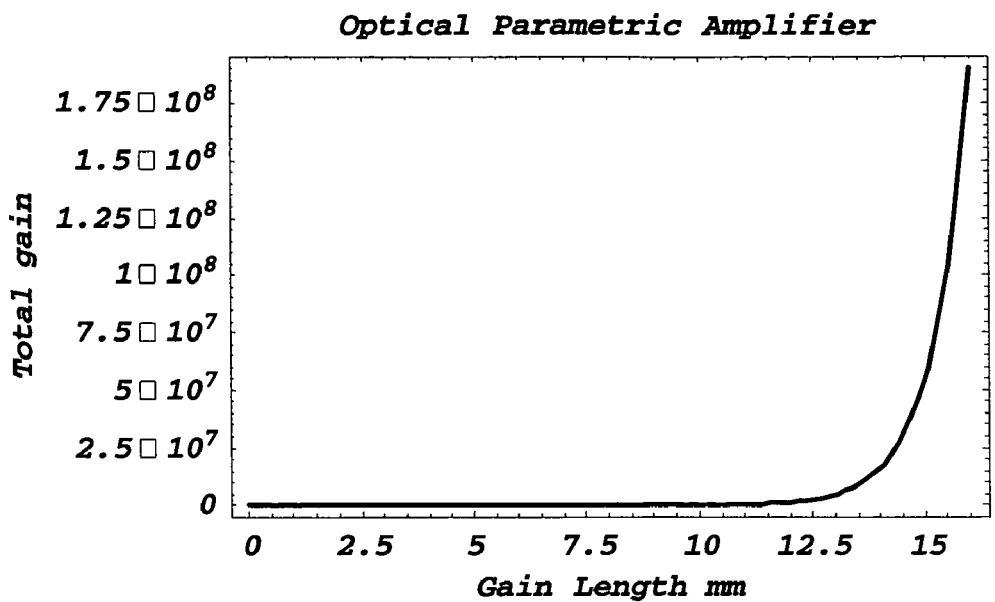
FIG. 3 is a graph of OPA gain versus crystal length in an embodiment of the present invention using an OPA for amplification or received laser light.

FIG. 3 is a plot of the total amplification (Eqn. [12]) of the above system versus gain (crystal) length. It incorporates a 67% maximum efficiency.

Some factors limiting the final gain are temporal/spatial walk-off, crystal damage threshold, pump laser power, crystal dispersion, k vector mismatch, and the characteristics of the interacting beams. Lithium Niobate is not necessarily the optimum choice for this application. Periodically poled materials can work much better (no temporal or spatial walk-off, high damage threshold, high $d_{eff}$.)

The small signal gain can be quite large, 10$^8$ in this example. A weak signal would be amplified by this amount so long as the final energy level of the signal does not approach the energy of the pump (non-depleted pump region.) A large signal on the other hand would see almost no gain at all.

Figure 4:
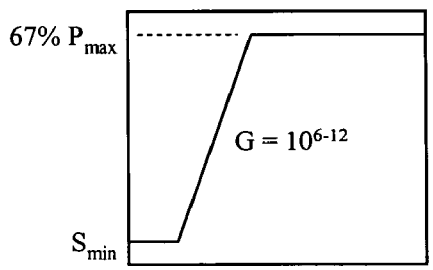
FIG. 4 illustrates the signal clamping feature of OPA gain saturation.

The final energy level of a large input signal (assuming zero losses in the OPA) would be the original signal plus 67% (for this example) of the pump energy. This gain saturation property is shown in FIG. 4.

The gain saturation (signal clamping) property of the OPA can be exploited to make high gain optical receivers resistant to damage and active optical power limiters.

Eigenmode Modification

Optical parametric amplification can be used to make the signal beam acquire similar propagation characteristics to that of the pump beam. Maximum gain will be imparted onto the signal beam where it overlaps with the pump beam in time and space, i.e., where the phase matching conditions are optimum ($\Delta k$=0). A system can be designed so that $\Delta k$=0 for only a small part of the signal beam but for the entire pump beam (the pump beam diameter is much smaller than the signal beam diameter.) After amplification the signal beam will have a strong "spike" in the place where it over lapped with the pump.

Figure 5:
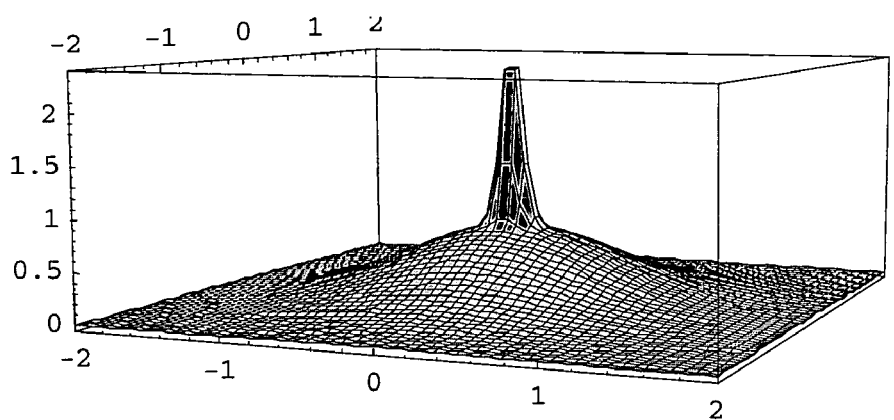
FIG. 5 illustrates a signal beam with an OPA induced "spike"

The spike shown in FIG. 5 has similar propagation properties as the pump beam even though it is actually the signal beam. For example, the signal beam can be strongly divergent while the central spike can be collimated. The collimated portion can be directed to the detector a long distance away while the remainder of the signal beam diverges towards the detector.

A robust receiver is made by designing the system so that a signal amplified to full saturation will still be below the damage threshold of the critical components.

An OPA can be designed to exploit its large gain, eigenmode modification, and saturated gain to create a device that will see small signals and also limit their dynamic range. The basic principle is to design an optical path for the received signal that does not travel directly to the detector. The eigenmode modification of an OPA is used to direct the signal to the detector. Because of the clamping action of the saturated gain process the OPA cannot amplify any signal more than 67% of the pump energy (in this example.) The system damage threshold is designed to be higher than this by an acceptable safety factor.

The total gain of this system will be less than the highest possible gain (10$^{12}$) because to obtain the highest possible protection from attack the pump laser will not be coincident with the signal. This causes the phase matching condition of the pump and signal to be less than optimum ($\Delta k \approx 0$.)

An OPA can amplify a wide spectral range of optical signals. The limitations are defined by the mixing crystal transmission and the pump wavelength. The Manley-Rowe relation (Equation [1]) is used to define the relationship of the signal, idler, and pump wavelengths. The following definitions are used;

$$\omega = \frac{1}{\lambda} \quad [15.]$$

$$\frac{1}{\lambda_P} = \frac{1}{\lambda_S} + \frac{1}{\lambda_I} \quad [16.]$$

$$\lambda_I = \frac{\lambda_P \lambda_S}{\lambda_S - \lambda_P} \quad [17.]$$

Figure 6:
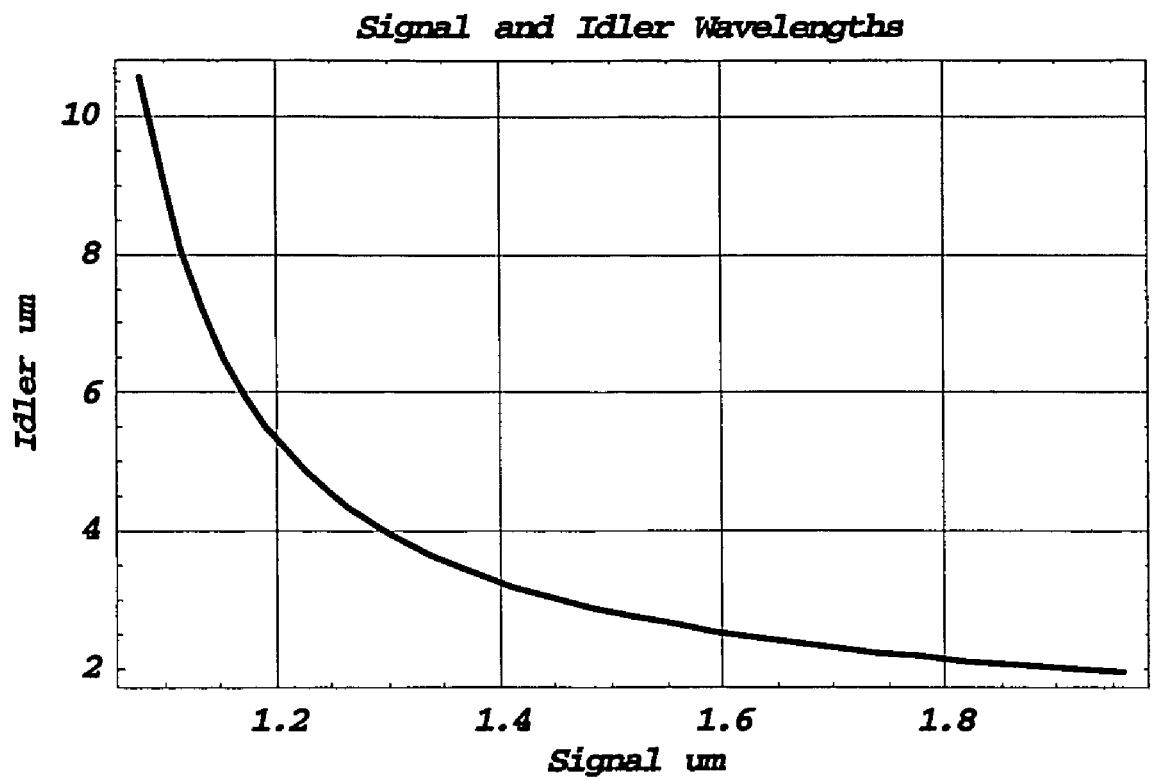
FIG. 6 is a graph showing the wavelength relationship of signal and idler in an OPA used according to the present invention.

Equation [15] is substituted into [8] giving [16] which is solved for the idler wavelength giving [17]. This is plotted in FIG. 6 at a fixed pump wavelength. For a pump wavelength of 0.98 μm the degenerate condition is 1.96 μm (down conversion) which limits one end of the tuning curve. The other end is limited by the crystal transmission window. Equation [17] is therefore plotted from 1.08 μm to 1.96 μm.

At 1.96 μm the signal and idler wavelengths are equal (down conversion). At shorter signal wavelengths the idler wavelength gets longer but contains the same information as the signal and vice versa. This allows the idler wavelength to be collected, amplified, and detected using the signal wavelength. (The information on the idler is transferred to the signal.) In the above simulation the idler wavelength range extends to 10 μm which is an inconvenient band to work with. For the same idler range the signal wave-length range is 1.08 μm to 1.96 μm. Common un-cooled photo detectors cover this range.

Common nonlinear mixing crystals have transmission curves that extend to about 4 μm. Proustite ($Ag_3AsS_3$) has a transmission window from 0.6 to 13 μm. It also has a high non-linear coefficient (10.4±2.2 pm/V.) This crystal should allow the construction of a sensitive OPA receiver for $CO_2$ laser wavelengths (10 μm) using a photo detector responding at 1.086 μm.

The present invention permits entire image amplification to be done with a single laser shot. This can be coupled with the time slicing capability of an OPA to do distance measurement at high resolution. Using this technique it is possible to examine surface roughness or texture at long range distances.

Time slicing an OPA can be done with great accuracy and is limited only by the driving electronics of the system. The total timing jitter of a laser system is some small percentage of the repetition frequency. In the case of the FHOENICS laser this is on the order of 10$^{-4}$. So if the oscillator was running at 1 GHz the total timing jitter would be on the order of 100 fsec.

A high gain, wide band, instantaneous response OPA is made by combining the optical signal to be amplified with a high intensity laser inside a mixing crystal. An OPA is tolerant to optical damage because of its saturated gain process. The mixing crystal rather than the detector becomes the component liable to damage. Typical damage thresholds for these crystals are in the range of 0.1 to several GW/cm$^2$.

A first prism combines the signal and pump laser to maximize the amplification process. The gain of an OPA is sensitive to phase matching conditions which include propagation characteristics of both the signal and pump beams. Under ideal conditions the k vector mismatch between the pump, signal, and idler is zero ($\Delta k$=0.)

The pump laser might damage the optical detector so it is preferably diverted from the signal path using a second prism. This also separates the idler from the signal before entering the detector. Because of eigenmode modification the amplified signal has the same beam propagation characteristics as the pump laser (diameter, divergence, direction). A pinhole is preferably used to separate the original signal from the amplified signal.

An OPA can be designed to withstand direct laser attack without damage, i.e., as an active optical power limiter. Passive limiters are commonly known but lack ideal performance characteristics. If an OPA is required by a system, it can be optimized as a power limiter and still perform well enough as an optical amplifier.

Figure 7:
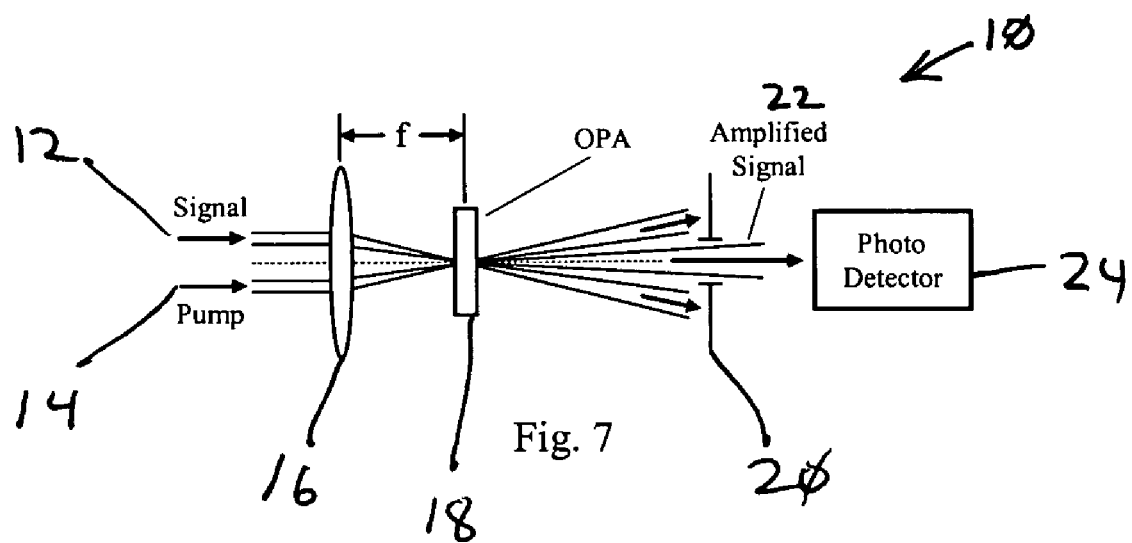
FIG. 7 is a schematic diagram of an active optical limiter according to the invention employing an OPA.

The basic concept is to design an optical receiver that does not direct the signal to the optical detector. It needs an additional input from a pump laser to direct a portion of the beam to the photo detector. Optical auto-correlators are often constructed using this method to re-direct the signal beam. The active power limiter of the invention operates by cross-correlating the pump with the signal and only the amplified signal impinges on the detector. An illustration of such device 10 is given in FIG. 7, with signal input 12, pump input 14, lens 16, OPA 18, pinhole 20, amplified signal output 22, and photodetector 24.

The gain saturation (signal clamping) property of the OPA protects the photo detector from being damaged. The critical component of the limiter now becomes the OPA crystal. This can be designed so that the signal input will have to be unreasonably high in order to damage the crystal. Lithium Niobate has a nanosecond regime damage threshold of 0.1 $GW/cm^2$. If the focused spot of the signal inside the crystal is 500 µm radius the input peak power required to damage the mixing crystal is 785.4 KW. If the pulse width of the signal is 10 nsec the energy required to damage the system is 7.85 mJ.

Very low power communication signals can be transmitted securely because an ordinary photo receiver would not be able to detect them. The signal could also be "swamped" with non-coherent collimated light of the same wavelength (i.e., LED) or coherent light of almost the same wavelength. A very high gain phase sensitive optical amplifier would be necessary to gain up the signal but it will not see the noise. This cannot be done in the electronic domain because the noise of the system would also be amplified keeping the signal obscured. A photo-multiplier tube would not be able to do this amplification if the wavelength of operation was long enough (>1.1 µm.) The PMT and photo detector also cannot discriminate between the signal and the LED noise.

The large bandwidth of ultra short pulses (a few to 10 s of nm) can also be exploited for additional security of transmission. (The spectral profile can be manipulated for encryption purposes.) In addition the transmissions can be done at long IR wave-lengths while the receivers operate at near IR wave-lengths due to the wavelength shifting capability of an OPA. There is also a band-pass filtering function built into the OPA. It amplifies one wavelength at a time. If the pump wavelength or phase matching conditions are changed the signal wavelength is changed. This allows the receiver to be scanned in the spectral domain to match the changing wavelength of the transmitter (quasi-spread spectrum.) The signal can also be transmitted at 10 µm and detected at 1 µm.

An OPA based optical amplifier is used in the present invention to gain the received signal in a LI/ADAR system to extend system performance. Heterodyning may be done inside the OPA to improve noise performance. Because of the very high gain the receiver optics can be much smaller, the transmitter laser can be smaller, and the system can look farther. The system is tolerant to optical damage and can be designed to be tolerant of direct laser attack. The phase sensitive nature of the parametric amplification will increase SNR in direct detection systems.

Intensity modulation (IMI) can be used to increase the laser power on target as well as decrease it every where else. This enhances the return signal of interest and reduces the noise.

Light travels at $3\times10^8$ m/s or 75 µm in 250 fsec. Time slice distance resolution using an OPA is limited only by the accuracy of the driving electronics because of its instantaneous optical response. Typical integrated timing jitter is $\approx 10^{-4}$ of the pulse repetition frequency. Currently the FHOENICS laser is mode-locked at 250 MHz. The timing jitter for the oscillator would be about 400 fsec making the distance error about ±120 µm.

Figure 8:
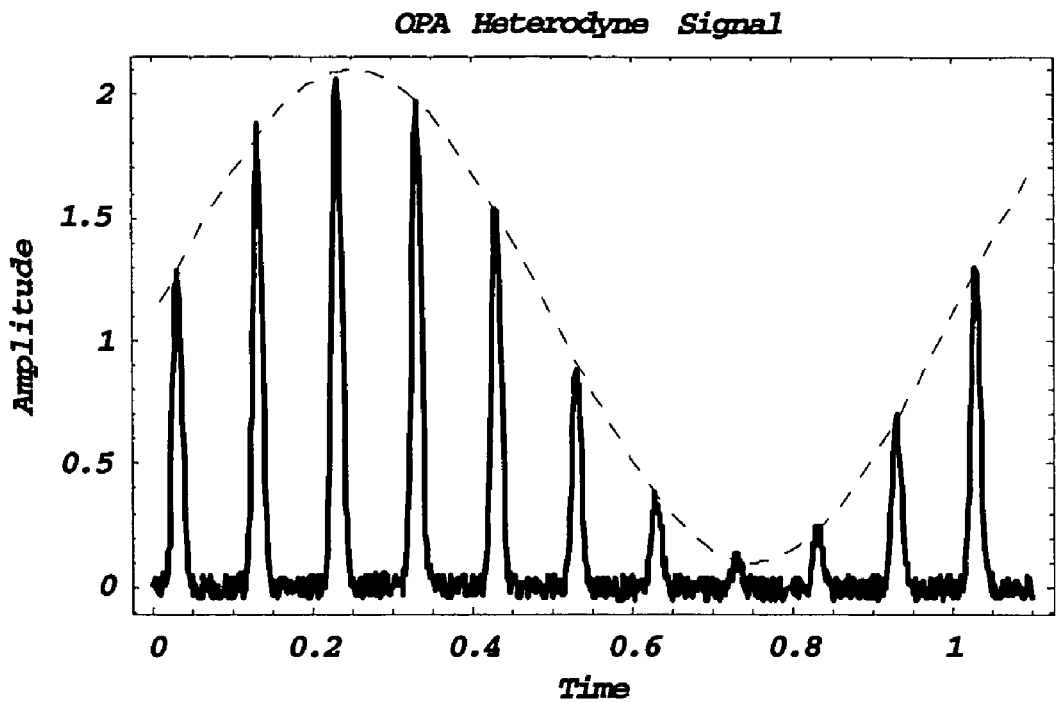
FIG. 8 is a graph showing an OPA reconstructed heterodyne signal according to the present invention.

The OPA amplifies 250 femtosecond wide points along the received signal at some sampling frequency, 50 MHz for this example. The amplified signal is heterodyned with the local oscillator giving a result that looks like "spikes" on top of system noise. It resembles a digitally created return-to-zero (RTZ) signal. A simulation of the constructed signal is given in FIG. 8. The dashed line represents the heterodyne signal.

The width of each spike is determined by the photo-detector time response. The highest frequency that can be collected is limited by the sampling frequency (25 MHz for δ 50 MHz transmitter.) The lowest frequency is limited by how long the system is allowed to collect samples and the distance (Z axis) resolution of the complete system. For a velocity of 3 cm/sec the heterodyne frequency is 20 KHz and requires a collection time of 50 µsec. Collecting data for 5 msec allows the user to resolve 300 µm/sec assuming that the system can resolve 300 µm.

A pulse multiplier can be used to increase the pulse repetition rate into the OPA. The referenced pulse shaper can produce 8 pulses from one input pulse. This increases the system sampling speed from 50 MHz to 400 MHz allowing a maximum heterodyning frequency of 200 MHz to be detected. The table below lists calculated values of Doppler velocities that can be resolved ($\lambda_o=1.5$ µm for all entries.)

TABLE 1

Doppler shift velocity calculations.

| Δf (Hz) | V (m/s) | V (mi/hr) |
|---|---|---|
| 200 | 300µ | 0.00067 |
| 20K | 0.03 | 0.067 |
| 25M | 37.5 | 84 |
| 200M | 300* | 672* |

*Mach 0.88

Figure 9:
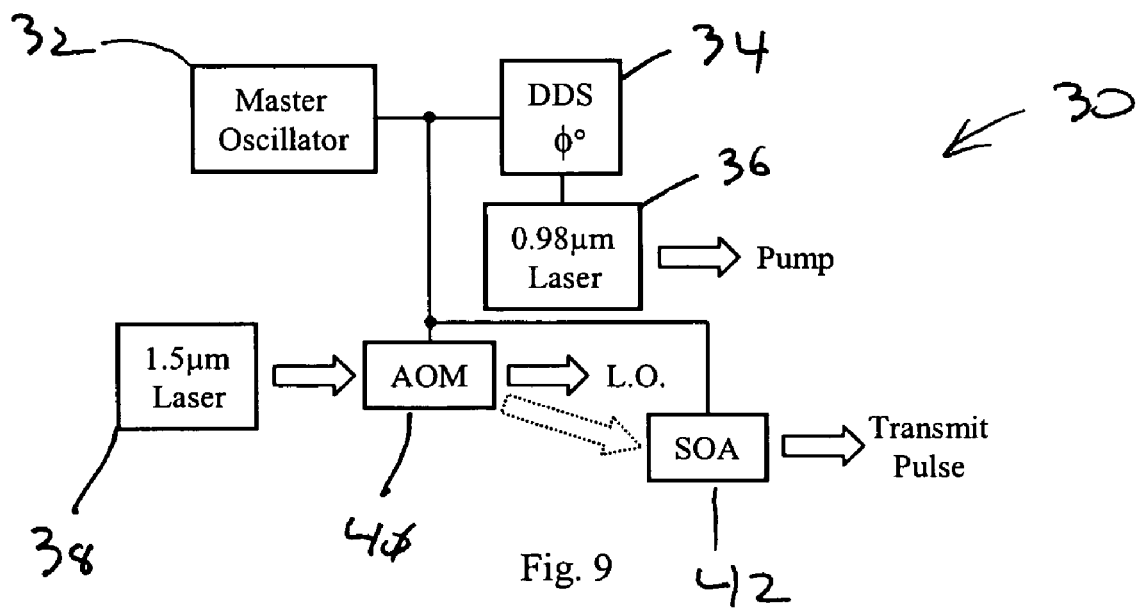
FIG. 9 illustrates an OPA based system according to the present invention.

FIG. 9 illustrates a transmission system 30 according to the invention, with master oscillator 32, direct digital synthesizer 34, pump laser 36 (e.g., 0.98 µm), signal transmission laser 38, acousto-optic modulator 40, and semiconductor optical amplifier 42. A master oscillator can drive the pump and transmitter lasers simultaneously. Direct digital synthesis (DDS) is used to control the pulse repetition rates and phase relationship.

The master oscillator operating at frequency $f_o$ acts as a digital clock counting out time segments of $\tau=1/f_o$ corresponding to coarse distance increments of $c\times\tau$. The phase control adjusts the pump delay over one period $\tau$ providing fine distance resolution. This way high resolution is obtained at any distance. This technique can be used with any mode-locked laser system, ND:YAG or $CO_2$ for instance.

Conformal optics follow an aerodynamic rather than an optical surface. If a receiver aperture can be very small then it can deviate from the aerodynamic shape without impacting the vehicle performance very much. An OPA can be used to amplify the received signal allowing the receiver optics to be greatly reduced in size. For example, adding a gain of $10^6$ reduces the diameter of the receiver by $10^3$ and maintains the same sensitivity.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of increasing laser intensity on a target, the method comprising the steps of:

computing a distance to the target by employing a receiving optical parametric amplifier;

based upon the distance, determining an ultra short laser pulse shape that will in traveling through a medium compress to approximately a minimum width;

emitting the pulse at the target whereby an intensity of the pulse is approximately maximized upon contact with the target; and receiving a return pulse.

2. The method of claim 1 additionally comprising the step of analyzing the return pulse in a system selected from the group consisting of laser radar systems and light detection and ranging systems.

3. The method of claim 1 wherein the determining step results is a laser pulse comprising fastest propagating wavelengths at the front of the pulse and slowest propagating wavelengths at the rear of the pulse.

4. The method of claim 3 wherein the determining step results in a laser pulse that compresses its width on its way to the target and increases its width on its way back from the target.

* * * * *